United States Patent
Golan

(10) Patent No.: US 6,882,717 B2
(45) Date of Patent: Apr. 19, 2005

(54) UNDETECTED PROVISION OF AUXILIARY SERVICES DURING A TELEPHONE CONVERSATION

(75) Inventor: Igal Golan, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 570 days.

(21) Appl. No.: 09/887,325

(22) Filed: Jun. 25, 2001

(65) Prior Publication Data

US 2002/0196920 A1 Dec. 26, 2002

(51) Int. Cl.[7] .......................... H04J 3/12; H04L 12/16; H04M 1/656; H04M 3/42; H04M 7/00
(52) U.S. Cl. .................. 379/201.01; 370/271; 370/524; 379/85; 379/207.02; 379/230
(58) Field of Search ................................. 370/259, 270, 370/271, 522, 524; 379/85, 201.01, 201.02, 201.12, 207.02, 229, 230

(56) References Cited

U.S. PATENT DOCUMENTS

| | | | | |
|---|---|---|---|---|
| 5,267,305 A | * | 11/1993 | Prohs et al. | 379/233 |
| 5,881,132 A | * | 3/1999 | O'Brien et al. | 379/35 |
| 5,937,040 A | * | 8/1999 | Wrede et al. | 379/93.23 |
| 6,345,047 B1 | * | 2/2002 | Regnier | 370/352 |
| 6,738,456 B1 | * | 5/2004 | Wrona et al. | 379/37 |

* cited by examiner

Primary Examiner—Harry S. Hong
(74) Attorney, Agent, or Firm—Browdy and Neimark, P.L.L.C.

(57) ABSTRACT

A telephone system for undetected provision of an auxiliary service during a telephone conversation between at least two participants over a communications network. The system includes a handset, having an input mechanism operable by a requesting participant to submit a request for an auxiliary service to be provided during the conversation, and a service processor, adapted to receive the request over the network and to provide the requested auxiliary service responsive to the request, such that at least one of the other participants receives substantially no indication of the request.

42 Claims, 2 Drawing Sheets

UNDETECTED PROVISION OF AUXILIARY SERVICES DURING A TELEPHONE CONVERSATION

FIELD OF THE INVENTION

The present invention relates to the field of telephonic services, particularly requesting services during a telephone conversation undetected by the other party to the telephone conversation.

BACKGROUND OF THE INVENTION

During a telephone conversation one has the ability to activate auxiliary services such as call forwarding, conference calling, etc., which are initiated by sending the appropriate control signal to the service provider using a method such as pressing a button or combination of buttons on the telephone. In a telephone connected to a public switched telephone network (PSTN), the control signals are usually transmitted in the form of dual-tone multi-frequency (DTMF) audio signals over the same channel as the voice. The result is that the other party to the conversation can detect that a request for a service has been made, although he or she may not be able to detect which particular service has been requested.

SUMMARY OF THE INVENTION

In some circumstances, the ability to request a telephonic service undetected by the other party to the conversation is important. Examples of services which are important or essential to remain undetected include having a call recorded, or listened to by the police, in the case of blackmail or an indecent proposal. While it is currently possible to activate such a service before the start of the telephone conversation, it is impractical to require that the service be activated in advance of all telephone conversations.

The present invention seeks to provide a new apparatus and methods for requesting and receiving auxiliary services during a telephone conversation, with the request undetected by the other party or parties to the telephone conversation. Preferably, the provision of the service is also not detected by the other party or parties to the telephone conversation.

In many conventional telephone systems the media (voice) and control signals are transmitted over the same communication channel. In preferred embodiments of the present invention, the auxiliary services are requested using control signals that are transmitted over a different communication channel (the control channel) from the voice channel, and thus the request remains undetected by the other participant(s) to the telephone conversation. Alternatively, the control signals needed to request the auxiliary services are transmitted over the voice channels, but are encoded in such a way as to be inaudible to and, preferably, undetectable by the other participants.

The auxiliary services are typically requested by pressing a button or combination of buttons on a touch-tone telephone, or by any other method known in the art for inputting control signals into a telephone. Alternatively or additionally, control signals could be input to a telephone via a computer, typically by pressing a key or combination of keys on the computer keyboard.

Requestable auxiliary services include, but are not limited to, a request to collect details of the conversation, i.e. the phone number(s) of the other participant(s), the time and duration of the phone call, the cost of the phone call, and the location of the other participant(s); a request to record the conversation; a request for a hidden party, such as the police or another interested party, to listen to the conversation without participating therein; and a request to find the IP of a party to a chat.

There is thus provided in accordance with a preferred embodiment of the present invention, a telephone system for undetected provision of an auxiliary service during a telephone conversation between at least two participants over a communications network, comprising a handset, having an input mechanism operable by a requesting participant to submit a request for an auxiliary service to be provided during the conversation, and a service processor, adapted to receive the request over the network and to provide the requested auxiliary service responsive to the request, such that at least one of the other participants receive substantially no indication of the request.

Further in accordance with a preferred embodiment of the present invention, the auxiliary service is requested by pressing a button or combination of buttons on the handset.

There is further provided in accordance with another preferred embodiment of the present invention, a method for providing an auxiliary service during a telephone conversation between at least two participants transmitted over a communications network, the method comprising receiving an input from a requesting participant, indicating a request for an auxiliary service, during the conversation, transmitting the request over the network to a service provider, such that at least one of the other participants receives substantially no indication of the request and providing the requested service to the requesting participant.

Still further in accordance with a preferred embodiment of the present invention, the input indicating a request for an auxiliary service comprises pressing a button or combination of buttons on the handset.

While the handset typically comprises a conventional telephone handset, in accordance with an alternative or additional preferred embodiment of the present invention, the handset comprises a computer keyboard, and the auxiliary service is requested by pressing a key or combination of keys on the keyboard. As used herein, the terms 'key' and 'button' are virtually interchangeable.

Additionally in accordance with a preferred embodiment of the present invention, the at least one of the other participants receives substantially no indication of the provision of the requested auxiliary service.

Also in accordance with a preferred embodiment of the present invention, the at least two participants comprise three participants.

Further in accordance with a preferred embodiment of the present invention, the communications network is selected from the group consisting of a PSTN, a mobile telephone network such as a cellular or a PCS network, a computer network such as the Internet, and a combination of such networks.

Still further in accordance with a preferred embodiment of the present invention, the communications network comprises first and second communication channels, and wherein voice signals are transmitted over the first communication channel, and control signals requesting the auxiliary service are transmitted over the second communication channel.

Additionally in accordance with a preferred embodiment of the present invention, use of the second communication channel for transmitting control signals is invoked by the requesting participant.

Also in accordance with a preferred embodiment of the present invention, use of the second communication channel is invoked by pressing a button or combination of buttons on the handset.

Further in accordance with a preferred embodiment of the present invention, the second communication channel comprises a second subscriber channel on an Integrated Service Digital Network (ISDN) voice/data line.

Still further in accordance with a preferred embodiment of the present invention, the second communication channel comprises the Internet.

Additionally in accordance with a preferred embodiment of the present invention, both voice signals, and control signals requesting the auxiliary service, are transmitted over the same communication channel.

Also in accordance with a preferred embodiment of the present invention, the control signals are encoded so as to be substantially undetectable by the at least one of the other participants.

Further in accordance with a preferred embodiment of the present invention, the encoded control signals are inaudible to the at least one of the other participants.

Still further in accordance with a preferred embodiment of the present invention, the control signals are encoded responsive to an input by the requesting participant.

Additionally in accordance with a preferred embodiment of the present invention, the control signals are encoded so as to be routed to the service processor, and removed from the communication channel prior to reaching the at least one of the other participants.

Further in accordance with a preferred embodiment of the present invention, the requesting participant is the initiator of the telephone conversation.

Also in accordance with a preferred embodiment of the present invention, the requesting participant is the recipient of the telephone conversation.

Still further in accordance with a preferred embodiment of the present invention, the request for an auxiliary service is selected from the group consisting of a request to collect at least one detail of the conversation, a request to record the conversation, and a request for a hidden party to listen to the conversation.

Additionally in accordance with a preferred embodiment of the present invention, the at least one detail of the conversation is selected from the group consisting of a phone number of a non-requesting participant, a location of a non-requesting participant, the time of the conversation, a duration of the conversation, and a cost of the conversation.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
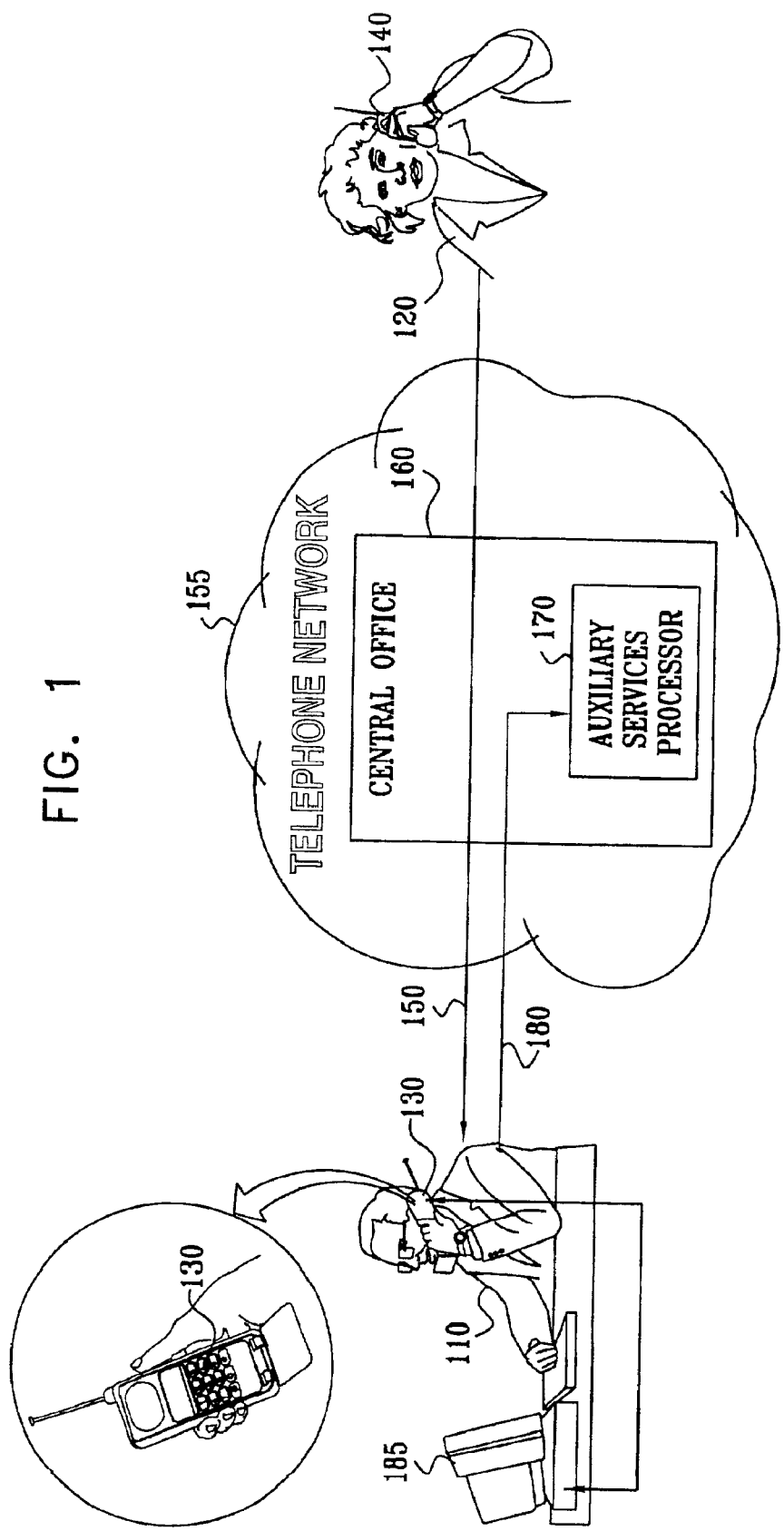
FIG. 1 is a simplified block diagram illustrating a telephone network allowing undetected provision of auxiliary services during a telephone conversation, constructed and operative in accordance with a preferred embodiment of the present invention.

Reference is now made to FIG. 1 which is a simplified block diagram illustrating a telephone network for undetected provision of auxiliary services during a telephone conversation, constructed and operative in accordance with a preferred embodiment of the present invention. Shown are first participant 110 and a second participant 120 in telephonic conversation using telephones 130, 140 over a voice communication channel 150 through a telephone network 155. Network 155 can be substantially any public or private telephone network, such as a PSTN, a mobile network such as a cellular or PCS network, the Internet, or a combination of such networks.

Vocal information is transmitted between first and second participants 110, 120 over channel 150, via a central office 160, which serves as a switching center for the telephone network, as is known in the art, Central office 160 is preferably also capable of acting as an auxiliary service provider, using an auxiliary services processor 170 upon request by one of participants 110, 120. Alternatively, while the central office is a convenient location for processor 170, such auxiliary services, as described hereinbelow, may be provided from other locations in network 155, as well.

If during the telephone conversation, first participant 110 wishes to utilize an auxiliary service provided by central office 160, first participant 110 requests such a service through telephone 130. First participant may be either the initiator or the recipient of the telephone conversation. The request for auxiliary service is preferably transmitted over a second (control) communication channel 180 to central office 160, where auxiliary service processor 170 is then invoked to provide the requested service.

Preferably, the auxiliary service is requested by pressing the appropriate button or combination of buttons on telephone 130, although other methods known in the art may be applicable. If the telephone conversation is transmitted, at least in part, over a computer network, the auxiliary service may be requested by pressing a key or combination of keys, on the keyboard of computer 185. Telephone 130 is preferably suitably modified, as described hereinbelow, so as not to transmit audible dual-tone multi-frequency (DTMF) signals over channel 150 when participant 110 presses the buttons required to request the auxiliary service.

Telephone 140 thus receives no indication of the request, and participant 120 is thus unaware that the service has been requested. If telephone 130 is a cellular telephone, channel 180 preferably comprises a cellular signaling channel, which is typically already present in network 155. If telephone 130 is a wireline telephone, signals on channel 180 are preferably carried over a separate physical or logical link from channel 150, parallel to but distinct from channel 150. An example of such a separate link is the second subscriber channel that is typically available on Integrated Service Digital Network (ISDN) voice/data lines. Alternatively, the signals on channel 180 may be carried on the same link as channel 150, but encoded in such a way that central office 160 recognizes and routes the signals to service processor 170, while preferably removing the signals from the voice channel to telephone 140, preferably by filtering the signal.

Figure 2:
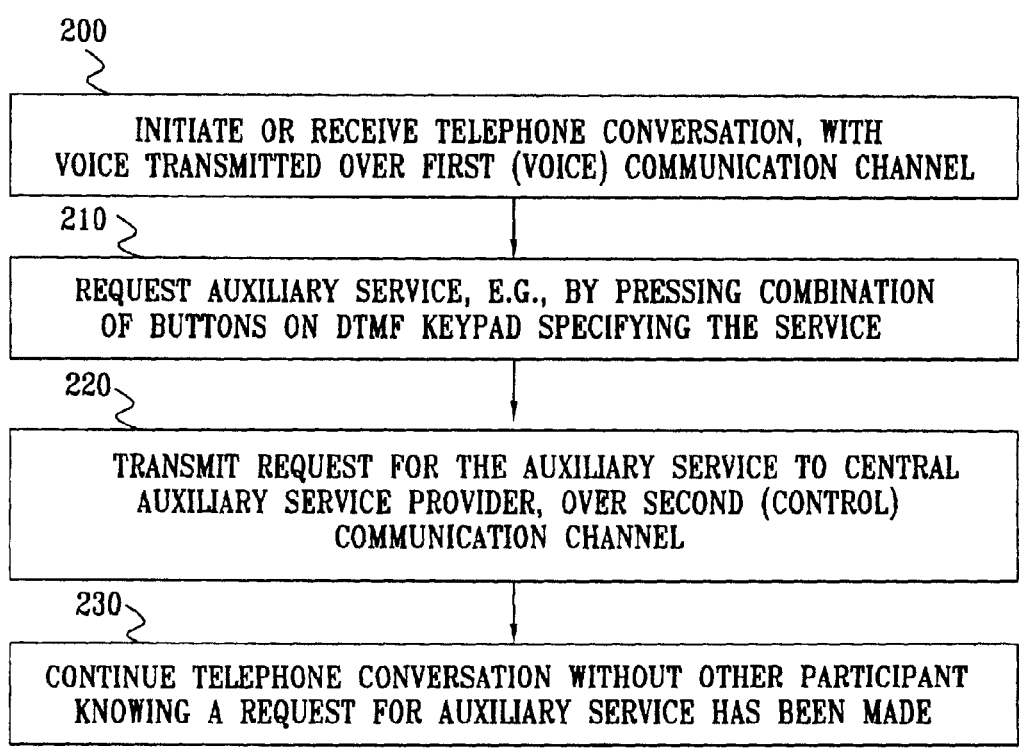
FIG. 2 is a flow chart illustrating a method for undetected provision of an auxiliary service during a telephone conversation, in accordance with a preferred embodiment of the present invention.

Reference is now made to FIG. 2 which is a flow chart illustrating a method for undetected provision of an auxiliary service during a telephone conversation, in accordance with a preferred embodiment of the present invention. As shown in step 200, a requester of an auxiliary service may be either the initiator or the recipient of a telephone conversation, with voice transmitted over a first (voice) communication channel. The requester requests the auxiliary service (step 210), typically by pressing the combination of buttons on his or her telephone keypad specifying the service. The request for the auxiliary service is transmitted (step 220) to a central auxiliary service provider, such as processor 170, over a second (control) communication channel. The telephone conversation is continued (step 230) without the non-requesting participant knowing a request for an auxiliary service has been made or that the auxiliary service has been provided.

As noted above, in PSTNs and certain other prior art telephone systems, there is typically a single communication channel for transmittal of both voice and control signals. Thus when a button is pressed on a DTMF phone, or a number is dialed on a dial telephone during a conversation, the other participant to the telephone conversation can hear the 'beep' or the 'clicks' as part of the conversation. If the button pressed is a signal to activate a telephone service, the other party to the conversation becomes aware of the request.

According to a preferred embodiment of the present invention, an extra channel is provided by the telephone and the network to allow the control signals to be sent over a separate communication channel from the voice. The extra channel is invoked, for example, by pressing an appropriate channel selection button provided for this purpose on the telephone. Then, pressing a button on the telephone during a conversation will not be detected by the other participant to the conversation, and by extension, requesting a service will also not be detected. Alternatively or additionally, the telephone may be designed so that when the user presses an appropriate button on the telephone, subsequent keystrokes will not generate DTMF tones, but will rather generate coded signals that are substantially inaudible to the other participant in the conversation.

In prior art cellular telephone systems, on the other hand, separate voice and signaling communication channels exist, and the signaling channel can be used to request services without detection. Yet once a telephone conversation is established, when the user presses a button on the telephone, it generates a DTMF tone over the voice channel and the other participant to the telephone conversation can hear the 'beep' during the conversation. Therefore, such cellular telephones are preferably also provided with a button enabling the user to select inaudible signaling, rather than DTMF tones, for requesting services without detection during a call.

In an additional or alternative embodiment, the control channel may be the Internet. Using an Internet browser, such as the mini-browsers currently available on portable phones, a user can request auxiliary services such as mentioned herein, during an ongoing telephone conversation, undetected by the other participant(s) to the conversation.

While embodiments of the present invention have been described above with relation to a telephone conversation between two participants, it is appreciated that the methods and apparatus of the present invention are applicable to the undetected requesting of auxiliary services during a telephone conversation of three or more participants.

It will be appreciated by persons skilled in the art that the present invention is not limited by what has been particularly shown and described hereinabove. Rather the scope of the present invention includes both combinations and sub-combinations of various features described hereinabove as well as variations and modifications thereto which would occur to a person of skill in the art upon reading the above description and which are not in the prior art.

What is claimed is:

1. A telephone system for undetected provision of an auxiliary service during a telephone conversation between at least two participants over a communications network, comprising:

a handset, having an input mechanism operable by a requesting participant to submit a request during the conversation to record the conversation; and a service processor, adapted to receive the request over the network and to record the conversation responsive to the request, such that at least one of the other participants receives substantially no indication of the request.

2. A system according to claim 1 wherein the auxiliary service is requested by pressing a button or combination of buttons on the handset.

3. A system according to claim 1 wherein the at least one of the other participants receives substantially no indication of the provision of the requested auxiliary service.

4. A system according to claim 1 wherein the at least two participants comprise three participants.

5. A system according to claim 1 wherein the communications network is selected from the group consisting of a public switched telephone network (PSTN), a mobile telephone network such as a cellular or a PCS network, a computer network such as the Internet, and a combination of such networks.

6. A system according to claim 1 wherein the communications network comprises first and second communication channels, and wherein voice signals are transmitted over the first communication channel, and control signals requesting the auxiliary service are transmitted over the second communication channel.

7. A system according to claim 6 wherein use of the second communication channel for transmitting control signals is invoked by the requesting participant.

8. A system according to claim 7 wherein use of the second communication channel is invoked by pressing a button or combination of buttons on the handset.

9. A system according to claim 6 wherein the second communication channel comprises a second subscriber channel on an Integrated Service Digital Network (ISDN) voice/data line.

10. A system according to claim 6 wherein the second communication channel comprises the Internet.

11. A system according to claim 1 wherein both voice signals and control signals requesting the auxiliary service are transmitted over the same communication channel.

12. A system according to claim 11 wherein the control signals are encoded so as to be substantially undetectable by the at least one of the other participants.

13. A system according to claim 12 wherein the encoded control signals are inaudible to the at least one of the other participants.

14. A system according to claim 12 wherein the control signals are encoded responsive to an input by the requesting participant.

15. A system according to claim 14 wherein the input comprises pressing a button or combination of buttons on the handset.

16. A system according to claim 12 wherein the control signals are encoded so as to be routed to the service processor, and removed from the communication channel prior to reaching the at least one of the other participants.

17. A system according to claim 1 wherein the requesting participant is the initiator of the telephone conversation.

18. A system according to claim 1 wherein the requesting participant is the recipient of the telephone conversation.

19. A system according to claim 1 wherein the input mechanism is further operable to submit a further request for a further service is selected from the group consisting of a request to collect at least one detail of the conversation and a request for a hidden party to listen to the conversation.

20. A system according to claim 19 wherein the at least one detail of the conversation is selected from the group consisting of a phone number of a non-requesting participant, a location of a non-requesting participant, a time of the conversation, a duration of the conversation, and a cost of the conversation.

21. A system according to claim 1 wherein the handset comprises a computer keyboard, and the auxiliary service is requested by pressing a key or combination of keys on the keyboard.

22. A method for providing an auxiliary service during a telephone conversation between at least two participants transmitted over a communications network, the method comprising receiving an input from a requesting participant during the conversation requesting that the conversion be recorded;

transmitting the request over the network to a service provider, such that at least one of the other participants receives substantially no indication of the request; and recording the conversation responsive to the request.

23. A method according to claim 22 wherein the input indicating a request for an auxiliary service comprises pressing a button or combination of buttons on the handset.

24. A method according to claim 22 wherein the at least one of the other participants receives substantially no indication of the provision of the requested auxiliary service.

25. A method according to claim 22 wherein the at least two participants comprise three participants.

26. A method according to claim 22 wherein the communications network is selected from the group consisting of a PSTN, a mobile telephone network such as a cellular or a PCS network, a computer network such as the Internet, and a combination of such networks.

27. A method according to claim 22 wherein the communications network comprises first and second communication channels, and wherein voice signals are transmitted over the first communication channel, and control signals requesting the auxiliary service are transmitted over the second communication channel.

28. A method according to claim 27 wherein use of the second communication channel for transmitting control signals is invoked by the requesting participant.

29. A method according to claim 28 wherein use of the second communication channel is invoked by pressing a button or combination of buttons on the handset.

30. A method according to claim 27 wherein the second communication channel comprises a second subscriber channel on an ISDN voice/data line.

31. A method according to claim 27 wherein the second communication channel comprises the Internet.

32. A method according to claim 22 wherein both voice signals and control signals requesting the auxiliary service are transmitted over the same communication channel.

33. A method according to claim 32 wherein the control signals are encoded so as to be substantially undetectable by the at least one of the other participants.

34. A method according to claim 33 wherein the encoded control signals are inaudible to the at least one of the other participants.

35. A method according to claim 33 wherein the control signals are encoded responsive to an input by the requesting participant.

36. A method according to claim 35 wherein the input comprises pressing a button or combination of buttons on the handset.

37. A method according to claim 33 wherein the control signals are encoded so as to be routed to the service processor, and removed from the communication channel prior to reaching the at least one of the other participants.

38. A method according to claim 22 wherein the requesting participant is the initiator of the telephone conversation.

39. A method according to claim 22 wherein the requesting participant is the recipient of the telephone conversation.

40. A method according to claim 22 and comprising submitting a further request for a further service selected from the group consisting of a request to collect at least one detail of the conversation and a request for a hidden party to listen to the conversation.

41. A method according to claim 40 wherein the at least one detail of the conversation is selected from the group consisting of a phone number of a non-requesting participant, a location of a non-requesting participant, the time of the conversation, a duration of the conversation, and a cost of the conversation.

42. A method according to claim 22 wherein the handset comprises a computer keyboard, and the auxiliary service is requested by pressing a key or combination of keys on the keyboard.

* * * * *